April 5, 1927.
G. A. LAUVER
1,623,254
DRAINING MEANS FOR SPLASH TROUGHS OF INTERNAL COMBUSTION ENGINES
Filed Jan. 9, 1926
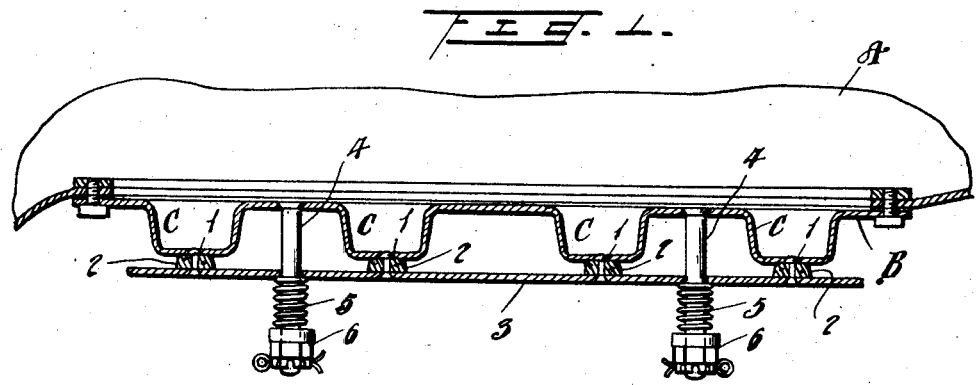
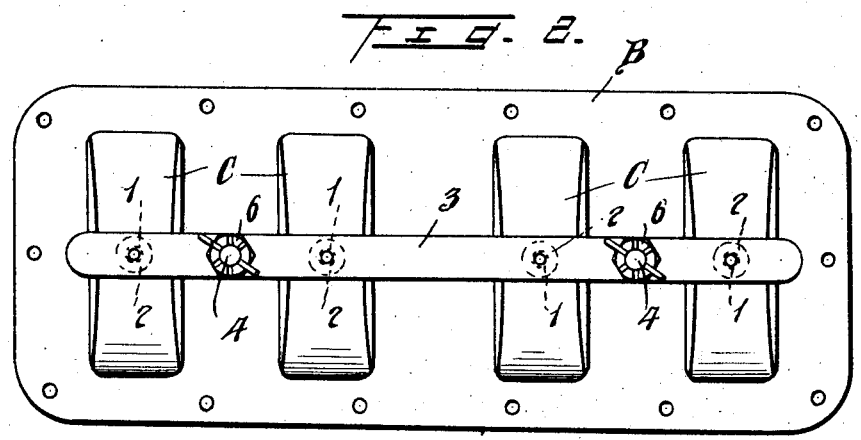
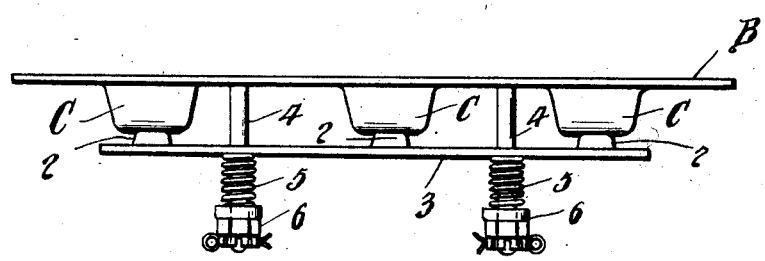
Inventor
G. A. Lauver,
By
Attorney Patented Apr. 5, 1927.

1,623,254

UNITED STATES PATENT OFFICE.

GEORGE A. LAUVER, OF PONCA CITY, OKLAHOMA, ASSIGNOR, BY MESNE ASSIGNMENTS, TO WILLIAM A. MORGAN, OF BUFFALO, NEW YORK.

DRAINING MEANS FOR SPLASH TROUGHS OF INTERNAL-COMBUSTION ENGINES.

Application filed January 9, 1926. Serial No. 80,380.

The invention relates to means for draining the oil from splash troughs of internal combustion engines.

In draining the crank cases of automobile engines using the splash system, it is impossible by present methods to drain the oil from the splash troughs, and because of the presence of this oil in the crank case, when new oil is supplied, efficiency of the new oil is lowered.

This invention has for its object means by which the oil remaining in the splash troughs after the crank case has been drained may be readily drained therefrom together with any sediment that may be in the bottom of the trough, so that the new oil supplied to the crank casing will not be polluted by any oil remaining in the crank casing, and the invention comprises providing the splash troughs with openings and having a bar slidably mounted on rods secured to the splash pan with valves to close the openings in the splash troughs, said bar being held in position to close the valves by means of springs mounted on the rods.

The invention will be described in detail hereinafter and will be found illustrated in the accompanying drawings, in which—

Figure 1 is a longitudinal sectional view of the lower portion of a crank casing showing the splash pan and troughs and the means for draining the splash troughs.

Figure 2 is a bottom plan view of the splash pan with the draining means attached, and Figure 3 is a view of a modified form of splash pan and troughs.

In the drawings similar reference characters will be used to designate corresponding parts throughout the several views.

A fragment of a crank casing of internal combustion engines is indicated at A having a splash pan B with splash troughs C of the usual construction. The means for draining the splash troughs C comprises an opening 1 in each of said troughs, and said openings 1 are closed by means of valves 2 secured to a bar 3 slidably mounted on rods 4 secured to the splash pan D, an expansible coil spring 5 is mounted on each rod 4 and engaging a nut 6 on the lower end of each rod and bar 3 to hold the bar in raised position, so that the valves 2 close the openings 1 in the troughs.

It will be apparent that the valves 2 may be constructed in any suitable manner and may be either ground valves, or valves made of rubber, cork or other suitable material.

In Figure 3 is shown a modified construction of splash pan B, having three splash troughs C, in which is shown the application of my invention thereto, the same reference characters used in connection with Figures 1 and 2 being employed to indicate the structure in Figure 3.

In use it will be apparent that to drain the oil from the splash troughs it will be necessary only to pull down on the bar 3 against the resistance of springs 5 thus opening the openings 1 in the bottom of the troughs to permit the oil and sediment to flow out, after which the valves will be closed by releasing pressure on the bar 3 and permitting the springs 5 to close the valves.

What is claimed is:—

1. In combination with the crank casing of internal combustion engines having a plurality of openings in the bottom thereof, a bar movable to and from the bottom, valves on said bar to close said openings, and resilient means engaging said bar and adapted to hold said valves seated in said openings.

2. In combination with the crank casing of internal combustion engines, splash troughs in the bottom of said casing, each of said troughs having an opening in the bottom thereof, said openings being alined, a bar, valves on said bar adapted to seat in said openings, and spring means to hold said valves seated in said openings.

3. In combination with the crank casing of internal combustion engines, and splash trough in the bottom of said casing, each of said troughs having an opening in the bottom thereof, said openings being alined, rods secured to the bottom of the crank casing, a bar slidably mounted on said rods, valves on said bar adapted to seat in said openings, and springs mounted on the rods and engaging said bar to hold said valves seated in the openings.

In testimony whereof I affix my signature.

GEORGE A. LAUVER.